UNITED STATES PATENT OFFICE.

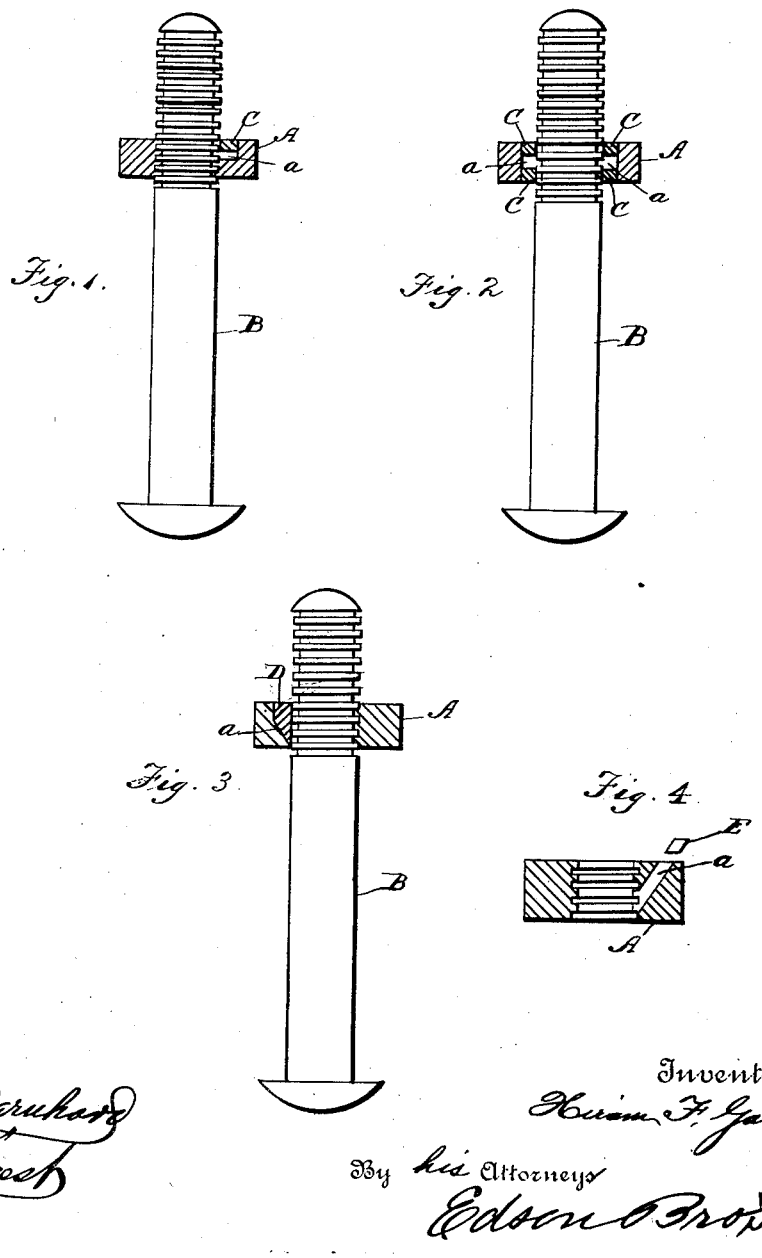

HIRAM F. GAINES, OF ROUSE'S POINT, NEW YORK.

NUT-LOCK.

SPECIFICATION forming part of Letters Patent No. 360,676, dated April 5, 1887.

Application filed October 6, 1886. Serial No. 215,497. (No model.)

*To all whom it may concern:*

Be it known that I, HIRAM F. GAINES, a citizen of the United States, residing at Rouse's Point, in the county of Clinton and State of New York, have invented certain new and useful Improvements in Nut-Locks, of which the following is a specification, reference being had therein to the accompanying drawings.

My invention relates to improvements in nut-locks; and it consists of the peculiar construction and adaptation of parts, substantially as hereinafter fully described, and pointed out in the claim.

The object of my invention is to provide a pocket or passage in the nut for the reception of a lubricant or oil to release the nut when it is held or locked by a rust-joint, which passage will also admit an instrument to be used in upsetting a thread on the bolt to form a lock for the nut.

In the accompanying drawings, which illustrate a nut-lock embodying my invention, Figure 1 is a sectional view taken through a nut in position on a bolt, which is shown in elevation. Fig. 2 is a similar view showing a nut provided with two passages or pockets for the reception of the lubricant. Fig. 3 is a like view with the nut provided with another form of pocket and a plug therefor, and Fig. 4 is a sectional view of the nut removed from the bolt and having an inclined pocket.

In the drawings, A designates a nut, which has the usual threaded opening to receive the threaded end of a bolt, B, which is of the ordinary pattern.

The nut A of my invention is provided with one or more passages or pockets, $a$, for the reception of an oil or lubricant, which is adapted to pass around the threads of the nut and bolt, and thereby release the former when it is held or locked by a rust-joint. The passages or pockets $a$ of the nut may be made substantially square or rectangular in form and extend only part way through the nut, as shown in Fig. 1 of the drawings; or the sides of the passage or pocket may be inclined, as shown in Figs. 3 and 4, one end of the said recess or pocket opening into the transverse threaded opening in the nut. The nut may have two of these passages or pockets, which may extend entirely through the same, as shown in Fig. 2 of the drawings.

C designates the cap or plug, which is fitted snugly in the outer portion or end of the pocket or passage $a$, to effectually close the same, and thereby prevent the escape of the lubricant after the same has been placed in the pocket. The plug may wholly or only partially close the pocket or passage, as shown in Figs. 1 and 2 of the drawings; or the plug may be of such a size as to entirely close up the pocket, as shown at D in Fig. 3. In Fig. 2 both ends of each passage or pocket $a$ of the nut may be closed, as shown; or, if desired, the plugs at one end of the said passages may be omitted. When a passage or pocket such as is shown in Fig. 3 is used, with a straight and inclined side, I preferably employ a plug of corresponding shape; and when the nut has the inclined recess or passage $a$ shown in Fig. 4 a plug, as E, having the correspondingly beveled or inclined sides is used to snugly fit therein.

In this class of devices, especially in their application to railroads and structures in damp places, or where they are exposed to the weather, a nut is liable to become immovably secured to its bolt by a rust-joint. To enable the nut to be removed without breaking the bolt, I have provided it with a pocket or recess, which I close at one or both ends, as the case may be, and pour therein a quantity of oil or other lubricant, which will be retained in the pocket by the plug, which closes one end thereof, and will find its way around the bolt by following the threads thereof. This recess or pocket $a$ in the nut also provides for the free passage of a tool or implement which can be used in upsetting a thread on the bolt, and thereby lock the nut against rotation, the cap or plug having been previously removed from the pocket. The tool or implement is held in an inclined position, with its lower end fitted in the passage or pocket and against the thread on the bolt which it is desired to upset, and the upper end of the said tool or implement is struck by a hammer or other suitable implement one or more times, in order to displace and upset the thread of the bolt and cause it to project more or less into the space or passage of the nut, as is obvious.

I am aware that it is not new to provide a nut with an inclined threaded passage in which a screw is fitted so that the inner end thereof will impinge or bear against one of the threads of the bolt, to thereby hold or lock the nut against rotation; but such is not my invention.

I am also aware that it is not new to provide the nut with a series of two or more lugs or flanges on its outer face which are adapted to be upset by a hammer or suitable implement to force one end or edge of the said lugs or flanges into the path of one of the threads on the bolt; and I am further aware that it is not new to provide the threaded part of the bolt with a longitudinal groove, in which a key or pin is driven after the nut has been screwed on the bolt, the key being embedded in the threads of the nut to prevent the latter from turning.

What I claim is—

A nut, substantially as described, having an oil receiver or passage which extends from the outer face of the nut to the interior threads of the same, and means, as a plug, for retaining the oil or lubricant in said passage for releasing the nut when secured by a rust-joint, as and for the purpose set forth.

In testimony whereof I affix my signature in presence of two witnesses.

HIRAM F. GAINES.

Witnesses:
   JOS. FORREST,
   S. O. EDMONDS.